(12) United States Patent
Shaw et al.

(10) Patent No.: US 10,346,104 B2
(45) Date of Patent: Jul. 9, 2019

(54) OBJECT TYPE BASED IMAGE PROCESSING

(71) Applicant: Hewlett-Packard Development Company, L.P., Houston, TX (US)

(72) Inventors: Mark Q. Shaw, Boise, ID (US); David Hatton, Boise, ID (US)

(73) Assignee: Hewlett-Packard Development Company, L.P., Spring, TX (US)

( * ) Notice: Subject to any disclaimer, the term of this patent is extended or adjusted under 35 U.S.C. 154(b) by 0 days.

(21) Appl. No.: 15/748,818

(22) PCT Filed: Oct. 30, 2015

(86) PCT No.: PCT/US2015/058388
§ 371 (c)(1),
(2) Date: Jan. 30, 2018

(87) PCT Pub. No.: WO2017/074436
PCT Pub. Date: May 4, 2017

(65) Prior Publication Data
US 2018/0225071 A1   Aug. 9, 2018

(51) Int. Cl.
*G06F 3/12* (2006.01)
*G03G 15/00* (2006.01)

(52) U.S. Cl.
CPC ......... *G06F 3/1219* (2013.01); *G03G 15/556* (2013.01); *G06F 3/1205* (2013.01); *G06F 3/1206* (2013.01); *G06F 3/1244* (2013.01); *G06F 3/1285* (2013.01); *G03G 2215/00037* (2013.01); *G03G 2221/1663* (2013.01)

(58) Field of Classification Search
CPC ............................. G03G 15/556; G06F 3/1219
See application file for complete search history.

(56) References Cited

U.S. PATENT DOCUMENTS

| | | | | |
|---|---|---|---|---|
| 7,295,342 B2 * | 11/2007 | McElvain | ............... | G06K 15/02 358/1.9 |
| 7,636,176 B2 | 12/2009 | Mikami | | |
| 7,804,629 B2 | 9/2010 | Jacobs et al. | | |
| 8,243,335 B2 * | 8/2012 | Nagai | .................... | H04N 1/603 358/1.9 |
| 8,982,418 B2 * | 3/2015 | Kawasaki | ............ | H04N 1/6058 358/1.9 |
| 9,606,752 B2 * | 3/2017 | Shin | ....................... | G06F 3/1204 |
| 2002/0135800 A1 * | 9/2002 | Dutta | .................... | G06F 3/1219 358/1.15 |
| 2003/0047099 A1 | 3/2003 | Hanyu | | |
| 2004/0223174 A1 * | 11/2004 | Mikami | ............... | H04N 1/2307 358/1.9 |
| 2004/0239995 A1 * | 12/2004 | Sadowara | ................ | H04N 1/46 358/2.1 |

(Continued)

FOREIGN PATENT DOCUMENTS

EP    2458496 A2    5/2012

OTHER PUBLICATIONS

Lexmark Firmware Update, Jul. 2014, "P440 (EC4.0) Firmware Release Notes for the Lexmark X548, C 746(8), C & X792, C & X925, and C & X95(0,2,4) Series Lexmark Printers", 7 pages.

*Primary Examiner* — Ted W Barnes
(74) *Attorney, Agent, or Firm* — Mannava & Kang (57) ABSTRACT

According to an example, object type based image processing may include analyzing an input object type, and implementing a toner savings.

15 Claims, 8 Drawing Sheets

(56) References Cited

U.S. PATENT DOCUMENTS

| | | |
|---|---|---|
| 2004/0249780 A1 | 12/2004 | Snover |
| 2005/0270549 A1* | 12/2005 | Zhou .................... G06K 15/12 358/1.13 |
| 2006/0023239 A1 | 2/2006 | Ferlitsch |
| 2006/0215910 A1* | 9/2006 | Megawa ............. H04N 1/3871 382/176 |
| 2006/0238792 A1* | 10/2006 | Chang ................ G06F 3/1219 358/1.13 |
| 2007/0008559 A1 | 1/2007 | Rich et al. |
| 2007/0153308 A1 | 7/2007 | Zemach et al. |
| 2008/0079962 A1* | 4/2008 | Torikoshi ............. G06K 15/02 358/1.9 |
| 2008/0170246 A1* | 7/2008 | Patton ................ H04N 1/2307 358/1.9 |
| 2008/0170247 A1* | 7/2008 | Patton ................ H04N 1/2307 358/1.9 |
| 2009/0073462 A1* | 3/2009 | Yamauchi .......... G03G 15/5029 358/1.2 |
| 2009/0310149 A1* | 12/2009 | Kawasaki ........... H04N 1/6022 358/1.8 |
| 2010/0214614 A1* | 8/2010 | Ferlitsch ............... G06K 15/02 358/1.18 |
| 2012/0020694 A1* | 1/2012 | Shirata ............... G03G 15/5016 399/81 |
| 2012/0033237 A1* | 2/2012 | Arora .................... G06F 3/1219 358/1.9 |
| 2012/0069361 A1* | 3/2012 | Jung .................... G03G 15/556 358/1.9 |
| 2013/0027730 A1* | 1/2013 | Taira .................... G06F 3/1211 358/1.13 |
| 2013/0128315 A1* | 5/2013 | Arora .................... G06F 3/1208 358/1.18 |
| 2013/0235392 A1* | 9/2013 | Iinuma ................ G06K 15/005 358/1.2 |
| 2015/0070715 A1 | 3/2015 | Iinuma |

* cited by examiner

OBJECT TYPE BASED IMAGE PROCESSING

BACKGROUND

In printing, a digital image may be sent to a printer, such as a laser printer, to produce a printed document. The digital image may be generated by an application on a device, such as a personal computer, a mobile device, etc. During image processing, the digital image may be converted to a particular color space, for example, by using a color space converter to translate the representation of a color from one basis to another to make the translated image look as similar as possible to the original image.

BRIEF DESCRIPTION OF DRAWINGS

Features of the present disclosure are illustrated by way of example and not limited in the following figure(s), in which like numerals indicate like elements, in which.

DETAILED DESCRIPTION

For simplicity and illustrative purposes, the present disclosure is described by referring mainly to examples. In the following description, numerous specific details are set forth in order to provide a thorough understanding of the present disclosure. It will be readily apparent however, that the present disclosure may be practiced without limitation to these specific details. In other instances, some methods and structures have not been described in detail so as not to unnecessarily obscure the present disclosure.

Throughout the present disclosure, the terms "a" and "an" are intended to denote at least one of a particular element. As used herein, the term "includes" means includes but not limited to, the term "including" means including but not limited to. The term "based on" means based at least in part on.

When printing a document, in order to provide a reduction in a cost per page printed, the document may be printed in a black-white format as opposed to a color format. In this regard, a printer driver may be installed onto a system from which the document is sent to the printer, where the printer driver may modify the print data stream before the print data stream is sent to the printer. Such a printer driver may need to be specifically tailored to the system and/or the platform (e.g., operating system) of the system from which the document is sent to the printer. Such a printer driver may also fail to differentiate between different aspects of a document such as whether the document is a copy or scan job, and/or whether the document includes raster content.

In order to address the aforementioned technical challenges, according to examples, an object type based image processing apparatus and a method for an object type based image processing are disclosed herein. When printing a document, the apparatus and method disclosed herein may provide for different types of document content to be treated differently to provide a user a specified printing experience. According to examples, the apparatus and method disclosed herein may implement use of object type information to provide, for example, a reduction in a cost per page printed.

According to examples, the apparatus and method disclosed herein may provide object type based toner savings embedded in a firmware, for example, of a printer. A print job may be sent to a printer in an unmodified form. When the print job is rendered, the firmware may generate object plane information. The changes are not made in the source document, instead the changes are made in the image pipeline when the rendered page is converted, for example, to cyan, magenta, yellow, and key (black) (CMYK) space, controlled at a pixel level by the object plane. The firmware may be configured to control the level of toner savings, for example, by loading specific toner savings tables of interest, to provide user-by-user level savings.

According to examples, the apparatus and method disclosed herein may provide for cost per page reduction and print quality optimization based on the type of document that is being printed. For example, the apparatus and method disclosed herein may account for different use profiles of a user who generally prints e-mails and legal documents, compared to a user who generally prints business graphics or marketing collateral. In this regard, the apparatus and method disclosed herein may differentiate between different types of objects (e.g., text, vectors, and raster) to implement different types of adjustment in print quality. In this regard, vectors may be described as graphics, and raster may be described as color images and photographs.

According to examples, with respect to applications of the apparatus and method disclosed herein, a user, such as a contractual customer, may specify a fixed cost per page for text documents. In this regard, when printing complex documents with text, vectors, and raster, the apparatus and method disclosed herein may provide for increased savings, for example, for vectors and raster to reduce the overall cost per page to meet user specifications for a fixed cost per page.

According to examples, the apparatus and method disclosed herein may utilize object type information that is sent with a print job to select a correct level of toner savings on an object by object basis. The selection of the correct level of toner savings may be further refined such that the toner savings may be designed to change (e.g., increase or decrease) over a life of a toner cartridge. For example, as a black toner cartridge nears the end of its life, the density may decrease. If at the beginning of the life of the cartridge a specified percentage (e.g., 20%) is selected for toner savings reduction, as the cartridge nears the end of its life, the apparatus and method disclosed herein may provide for the cartridge to decrease the savings by setting down more toner. The additional toner may effectively increase the density, resulting in a user not noticing the end of life state of the cartridge. In this regard, the apparatus and method disclosed herein may provide for other types of toner savings, such as toner savings based on the needs of a user.

According to examples, with respect to the aspect of the firmware as disclosed herein, the apparatus and method disclosed herein may provide an embedded approach to implement toner savings for any document that is printed, independent of the system (e.g., a personal computer, a mobile device, etc.) and/or the platform (e.g., operating system) of the system that is used to generate the print instructions. For example, the apparatus disclosed herein may be implemented as firmware (i.e., by embedding) in a printer to receive a document that is to be printed, to determine content of the document, and to apply toner savings at the printer to thus provide an embedded solution for toner savings, independent of the system and/or the platform of the system that is used to generate the print instructions. In this regard, the cost per page toner savings may be controlled by the remote management capabilities of the system that is used to generate the print instructions. Moreover, by embedding as firmware as disclosed herein, a print pipeline may be directly accessed and configured to modify toner application in a variety of manners (e.g., by directly controlling a laser of a laser printer to achieve toner savings, for example, as a percentage reduction in toner usage, a toner reduction based on a type of object, and/or a toner reduction based on a type of user or a position of the user). For example, the type of user may include an employee versus a client, and the position of the user may include an administrator versus an executive, etc. With respect to the aspect of the embedded approach to implement toner savings, according to examples, the apparatus and method disclosed herein may use an object map and a print system state (and/or knowledge) to implement the toner savings. In this regard, the state may include, for example, print cartridge life, print cartridge type, environment, time of a print job, length of a print job, etc., and the knowledge of the state may also be used for configuring a print pipeline to obtain a desired result.

Figure 1:
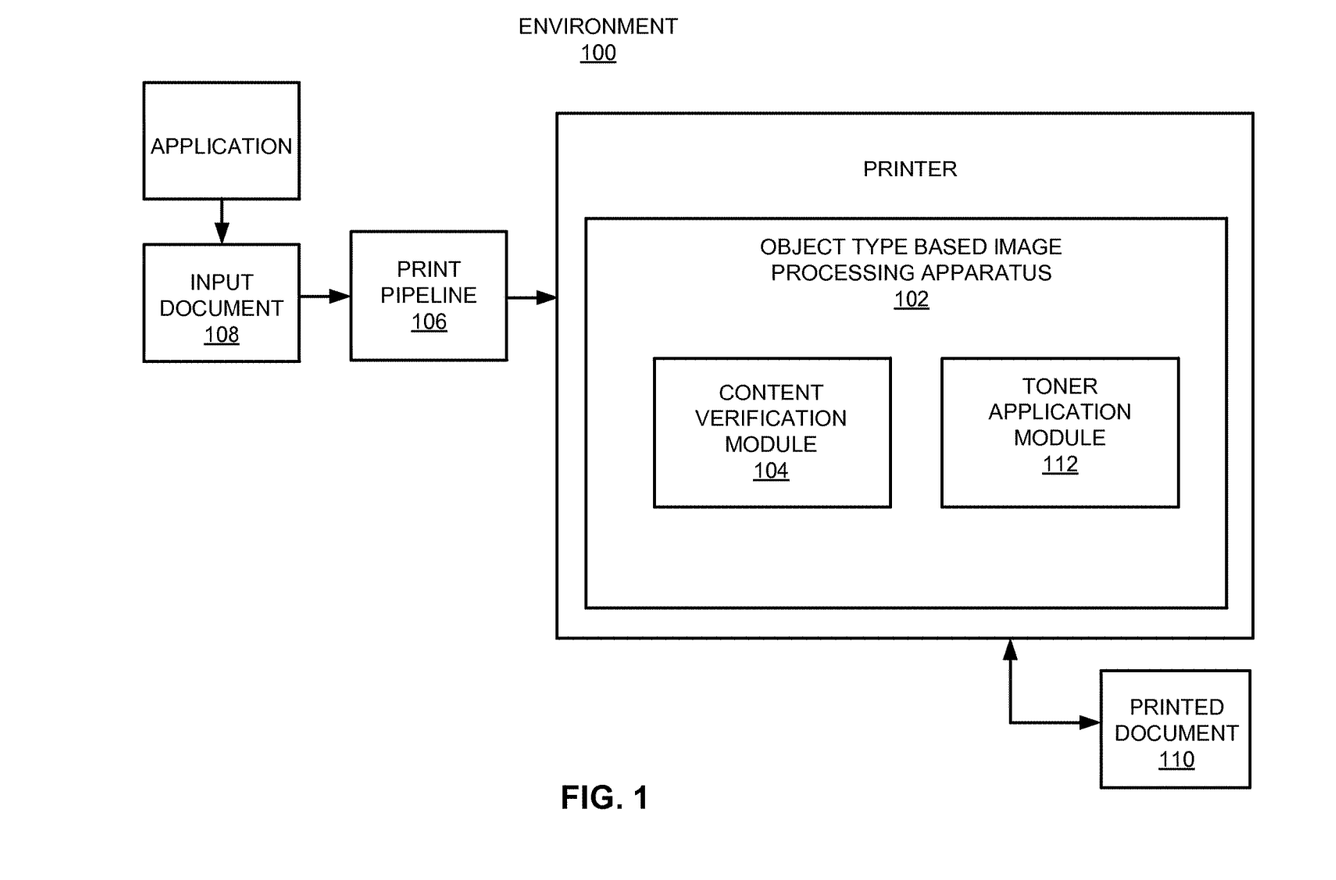
FIG. 1 illustrates an environment for an object type based image processing apparatus, according to an example of the present disclosure.
Figure 2:
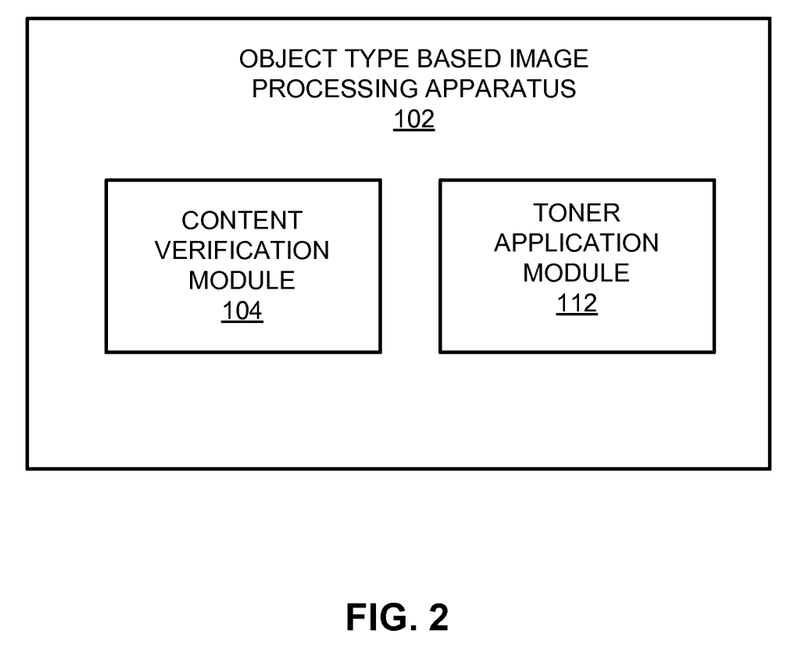
FIG. 2 illustrates an architecture of the object type based image processing apparatus of FIG. 1, according to an example of the present disclosure.

FIG. 1 illustrates an environment 100 for an object type based image processing apparatus (hereinafter also referred to as "apparatus 102"), according to an example of the present disclosure. FIG. 2 illustrates a layout of the apparatus 102, according to an example of the present disclosure.

Referring to FIG. 1, the apparatus 102 may include a content verification module 104 to receive, from a print pipeline 106, an input object type associated with an input document 108 that is to be printed. Alternatively or additionally, the content verification module 104 may receive, from a different pipeline associated with printing of the input document 108, the input object type associated with the input document 108. For example, the different pipeline associated with printing of the input document 108 may provide for the generation of object plane information as disclosed herein in a copy processing layer, before data is received by a print module that is to provide for printing of the input document 108. The content verification module 104 may analyze the input object type to determine whether the input object type is a correct object type (e.g., is a raster object type indeed a raster object, as disclosed herein). In response to a determination that the input object type is not the correct object type (e.g., the raster object type is a text object), the content verification module 104 may change the input object type to the correct object type, and configure the print pipeline 106 (e.g., for proper operation based on the object type) based on the correct object type to generate a printed document 110. In response to a determination that the input object type is the correct object type, the content verification module 104 may configure the print pipeline 106 based on the input object type to generate the printed document 110. According to examples, the input object type may include a text object type, a vector object type, raster object type, a specified shape, a specified color in a rendered image related to the input document 108, or a user defined object type.

A toner application module 112 may implement a toner savings based on the configuration of the print pipeline 106. According to examples, the toner savings may be implemented as a percentage of toner usage reduction (e.g., 20% reduction as disclosed herein) based on the configuration of the print pipeline 106. According to examples, the percentage of toner usage reduction may be reduced (e.g., ramped down as disclosed herein) as a toner cartridge for application of the toner approaches an end of a specified life of the toner cartridge. According to examples, for the configuration of the print pipeline based on the correct object type, the toner savings may be implemented as a specific level of toner usage (e.g., a specified amount of toner usage) based on the correct object type, and for the configuration of the print pipeline based on the input object type, the toner savings may be implemented as the specific level of toner usage based on the input object type. According to examples, the toner savings may be implemented as a modification of laser power application (e.g., an increase or decrease of laser power application) based on the configuration of the print pipeline. According to examples, the toner savings may be implemented as a user specified preference (e.g., as a certain amount of toner application) related to the input object type based on the configuration of the print pipeline. Other examples of toner savings may be based on halftone level and screen selection, template based machine readable instructions that alter edge content, alternate three-dimensional maps which convert pixel values, etc.

The modules and other elements of the apparatus 102 may be machine readable instructions stored on a non-transitory computer readable medium. In this regard, the apparatus 102 may include or be a non-transitory computer readable medium. In addition, or alternatively, the modules and other elements of the apparatus 102 may be hardware or a combination of machine readable instructions and hardware.

Figure 3:
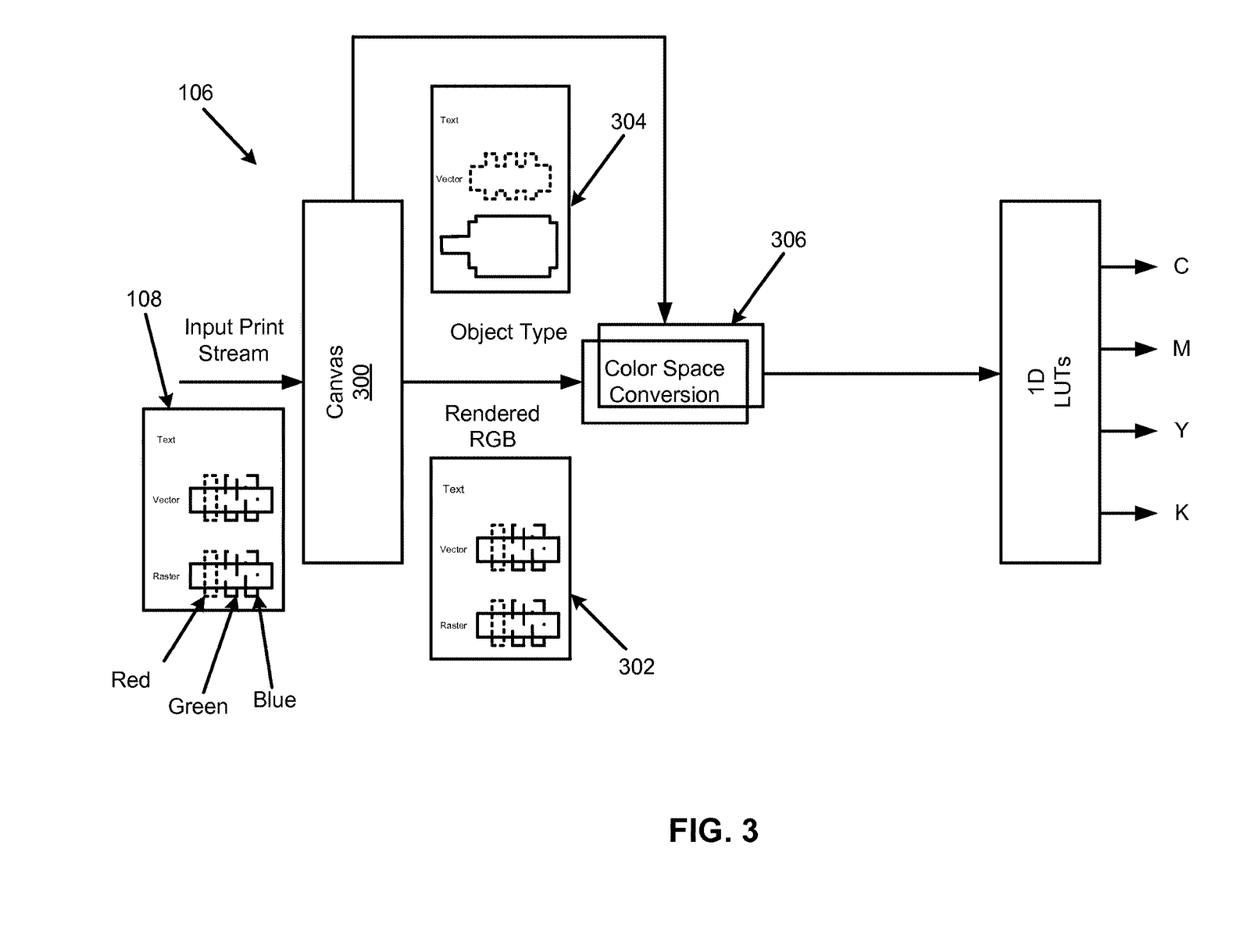
FIG. 3 illustrates a print pipeline for the object type based image processing apparatus of FIG. 1, according to an example of the present disclosure.

FIG. 3 illustrates a print pipeline for the apparatus 102, according to an example of the present disclosure.

Referring to FIG. 3, the print pipeline 106 for the apparatus 102 may include an imaging pipeline that includes the input document 108, the print stream for which is rendered on a canvas 300. The canvas 300 may be used to generate a three-dimensional red, green, and blue (RGB) input image 302 and an object map 304 (i.e., an object type image) as inputs to a color space conversion block 306. The color space conversion block 306 may convert the RGB input image 302 and the object map 304, for example, to CMYK values for printing the input document 108 to generate the printed document 110. Each object type (e.g., text, vector, and raster) may include its own color table for use by the color space conversion block 306 (e.g., a first color table may be used with text object types, a second color table may be used with vector object types, etc.). The object map 304 may describe the type of each pixel in the input image 302. For example, objects that are represented as light gray in the object map 304 may be identified as text in the object map 304, objects that are represented as medium gray in the object map 304 may be identified as vector objects (e.g., lines, boxes, gradients, etc.), and objects that are represented as dark gray in the object map 304 may be identified as raster (e.g., photo, or any document content that has been rasterized) in the object map 304. In this regard, the light gray, medium gray, and dark gray representations are disclosed herein to facilitate a description of how rendered image data may be treated differently. However, other colors and/or techniques may be similarly used instead of or in addition to the light gray, medium gray, and dark gray representations disclosed herein. Thus the different types of representations may be described as markers for treatment of image data. Moreover, for the example of FIG. 3, the object plane is illustrated as a two bits per pixel (2 bpp) object map 304 that corresponds to the set {none, text, graphics, raster}. With respect to a toner savings scheme, the object map 304 may be larger than 2 bpp, and may encode an arbitrary set of pixel types, e.g., {text, graphics, raster, logo, header}, or {text, advertisement, medical image, graphics, important legal instructions, . . . }, etc.

With respect to the print pipeline 106, the toner application module 112 may apply different levels of toner savings to different types of objects. For example, the toner application module 112 may provide for the implementation of a more conservative toner savings strategy for text objects, compared to raster objects. In this regard, the toner application module 112 may provide for the implementation of a more aggressive (e.g., higher percentage of toner reduction) toner savings strategy for vector and raster objects.

The toner application module 112 may be embedded to provide segmentation of an original image (e.g., the object map 304) for the input document 108. In this regard, if the original image for the input document 108 is from a copied or scanned document, the object plane for identifying the object type may be respectively generated from the copied or scanned image. Thus, this embedded approach for the apparatus 102 may provide for the selective attenuation of a toner profile for copied and scanned document. For mobile print solutions (e.g., phones, tablets, etc.) which may not include an object plane associated with a print job, segmentation may be used to create an object plane.

Figure 4A:
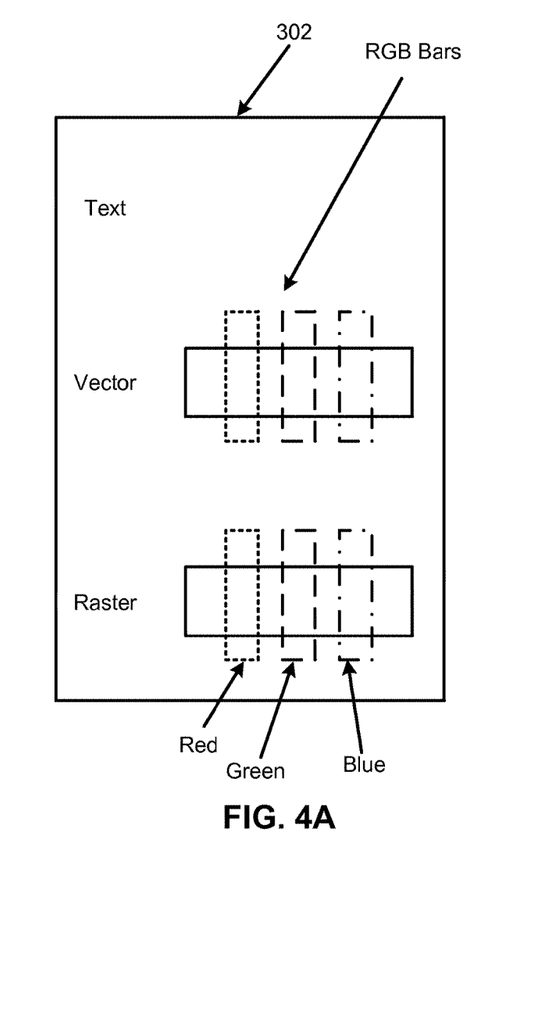
FIGS. 4A and 4B respectively illustrate a source document and object mapping for the object type based image processing apparatus of FIG. 1, according to an example of the present disclosure.
Figure 4B:
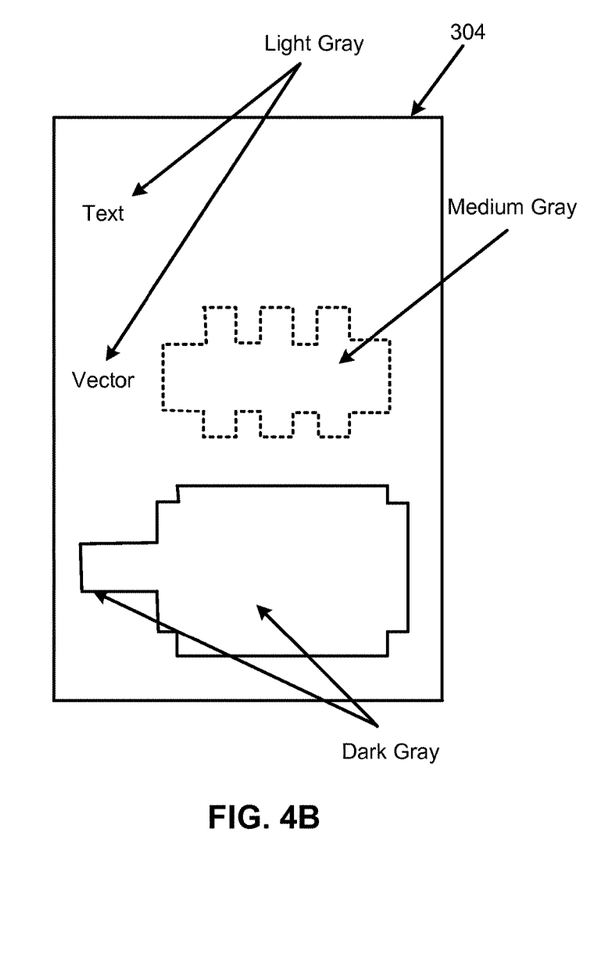

FIGS. 4A and 4B respectively illustrate a source document and object mapping for the apparatus 102, according to an example of the present disclosure.

Referring to FIGS. 4A and 4B, the three-dimensional RGB input image 302 is shown in FIG. 4A, and the corresponding object map 304 is shown in FIG. 4B. Text in the object map 304 may be displayed, for example, as light gray objects in the object map 304, vector objects (e.g., lines, boxes, gradients, etc.) in the object map 304 may be displayed, for example, as medium gray objects in the object map 304, and raster content (e.g., photo, or any document content that has been rasterized) in the object map 304 may be displayed, for example, as dark gray objects in the object map 304. For the example of FIGS. 4A and 4B, the words "Text" and "Vector" (or any other text) may be displayed as light gray. For the example of FIGS. 4A and 4B, the RGB bars (or any other vectors) displayed next to the word "Vector", which are vector objects, may be displayed as medium gray. For the example of FIGS. 4A and 4B, the word "Raster" (or any other raster content) and the RGB bars displayed next to the word "Raster", when converted to raster, may be both displayed as dark gray as shown in FIG. 4B. Thus, the three different object types of text, vector, and raster may be respectively displayed as light gray, medium gray, and dark gray, when respectively converted to text, vector, and raster.

The aspect of conversion to text, vector, and raster may be similarly applied to documents that are part of a copy or scan pipeline. For example, for a document that is part of a copy or scan pipeline, when text for such a document is converted to text objects, the text objects may be displayed as light gray in an object map. In this manner, for a document that is part of a copy or scan pipeline, when text, vector, and/or raster content for such a document is converted to text objects, to vector objects, and/or to raster objects, the converted text objects, vector objects, and raster objects may be respectively displayed as light gray, medium gray, and dark gray in an object map.

The content dependent toner savings implemented by the toner application module 112 may provide an aggressive technique for reducing toner in regions of photographic content, as well as for reducing the toner used in color-text regions of the input document 108. For example, with respect to the object map 304 shown in FIG. 4B, the toner application module 112 may be used to specify a percentage reduction (e.g., 20% reduction) in toner application for a specific type of content (e.g., text content and/or vector content), a specific type of toner application (e.g., black and white toner application) for raster content, and/or a specific type of conversion (e.g., monochrome color conversion) for raster content.

The content verification module 104, which is disposed downstream of the print pipeline 106, may determine whether an object classified by the application (e.g., in conjunction with the print pipeline 106), that sends the input document 108 to be printed, as text, a vector, or as raster, is indeed text, a vector, or raster. Further, the content verification module 104 may determine whether an object classified by the application as a particular category of object (e.g., a particular shape such as a face, a logo, etc., or an identification, etc.) is indeed the particular category of object. In this regard, any misclassified objects may be re-classified by the content verification module 104 as a correct object type. For example, an application on a device (e.g., a personal computer, a mobile device, etc.) may classify all of the text (or vector and/or raster) objects on an input document 108 as raster (for example, by converting all of the text (or vector and/or raster) to raster). In this regard, the content verification module 104 may determine whether the text objects are indeed raster. The misclassified text objects may be re-classified by the content verification module 104 as text objects. Thus, print jobs that include documents that are generated by the application, documents that are scanned or copied, or any types of documents that are to be printed, may be analyzed by the content verification module 104 to confirm object classification to implement toner savings on a per object and/or per job basis.

For example, referring to FIGS. 4A and 4B, the content verification module 104 may determine whether the text "raster" that has been classified as raster as shown in FIG. 4B is indeed raster. In this regard, since the text "raster" should actually be classified as text, the content verification module 104 may re-classify (or correct the classification) of the text "raster" as a text object.

As disclosed herein, the toner application module 112 may utilize object type information that is sent with a print job to select a correct level of toner savings on an object by object basis. The selection of the correct level of toner savings may be further refined such that the toner savings may be designed to change (e.g., increase or decrease) over the life of a toner cartridge. For example, as a black toner cartridge nears the end of its life, the density will decrease. If at the beginning of the life of the cartridge a specified percentage (e.g., 20%) is selected for toner savings reduction, as the cartridge nears the end of its life, the toner application module 112 may intelligently change (e.g., decrease as a ramp from 20% to 0%, in increments of 1% (or another specified percentage)) the savings by setting down more toner. The additional toner may effectively increase the density, resulting in a user not noticing the end of life state of the toner cartridge. In this regard, the toner application module 112 may provide for other types of toner savings, such as toner savings based on the needs of a user. Thus, the toner application module 112 may intelligently change the savings based on parameters, such as, a monetary value associate with usage of toner, an amount of time of usage of toner, etc., which may be associated with an end of life of a cartridge.

Figure 5:
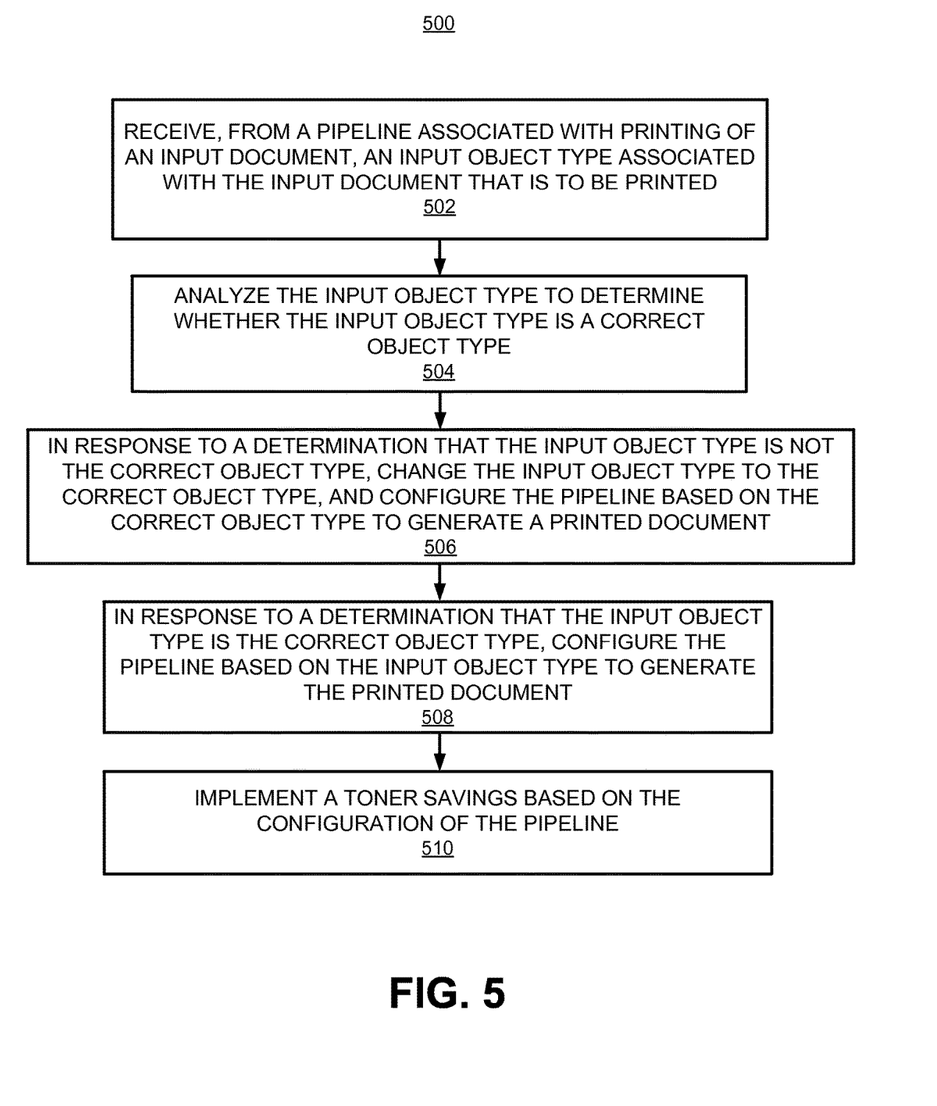
FIG. 5 illustrates a flowchart of a method for object type based image processing, according to an example of the present disclosure.
Figure 6:
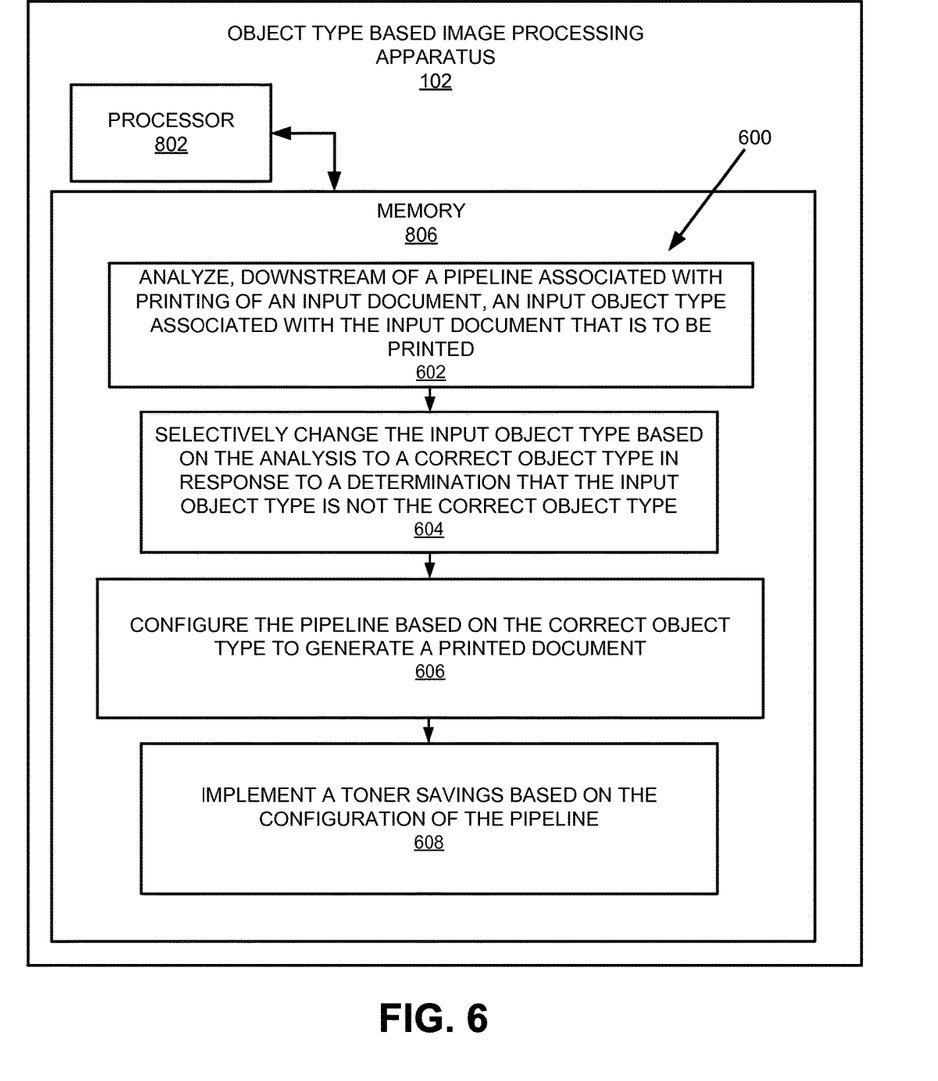
FIG. 6 illustrates another layout of the object type based image processing apparatus for implementing another flowchart of a method for object type based image processing, according to an example of the present disclosure.
Figure 7:
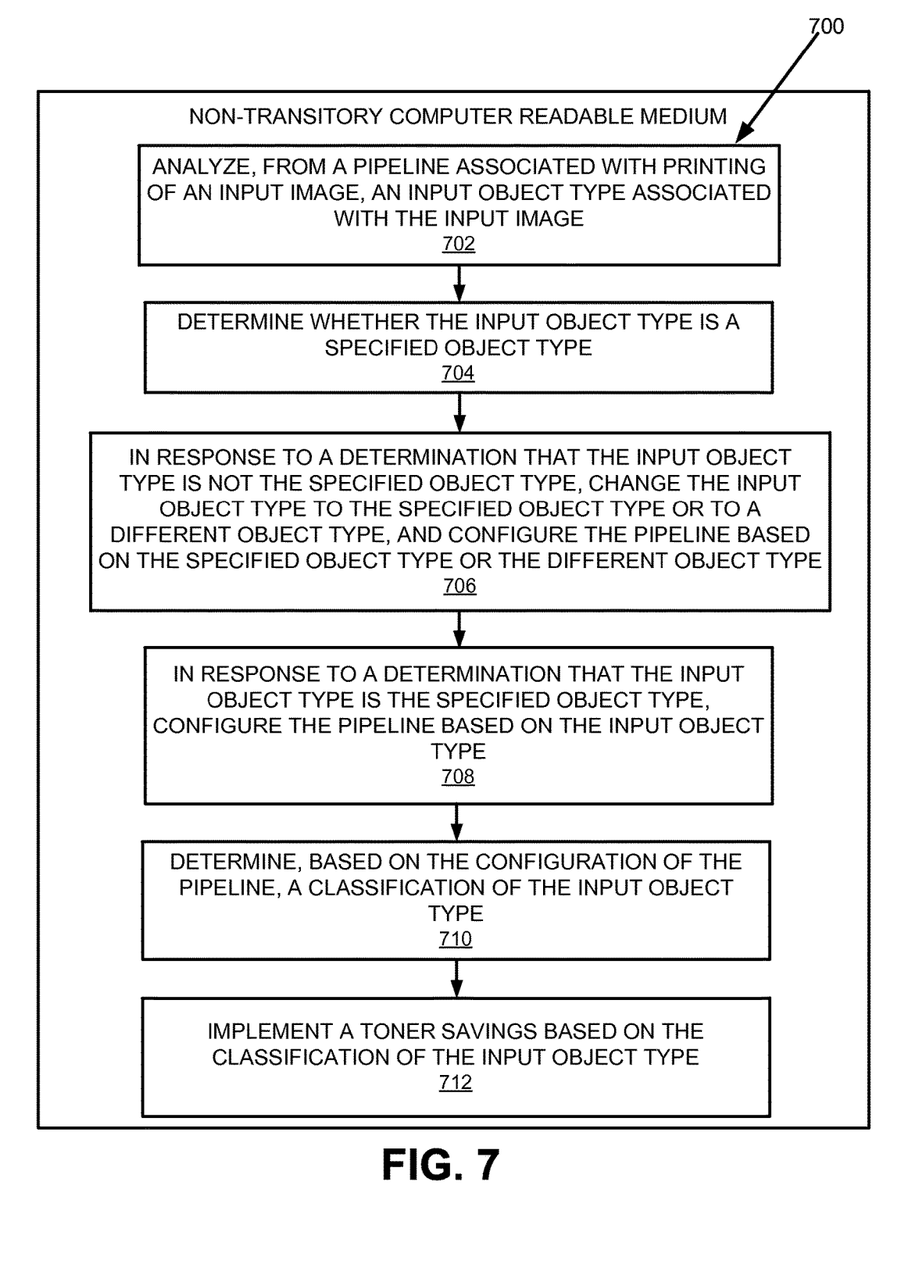
FIG. 7 illustrates a non-transitory computer readable medium for implementing another flowchart of a method for object type based image processing, according to an example of the present disclosure.

FIGS. 5-7 respectively illustrate flowcharts of methods 500, 600, and 700 for object type based image processing, corresponding to the example of the object type based image processing apparatus 102 whose construction is described in detail above. The methods 500, 600, and 700 may be implemented on the object type based image processing apparatus 102 with reference to FIGS. 1-4 by way of example and not limitation. The methods 500, 600, and 700 may be practiced in other apparatus.

Referring to FIG. 5, for the method 500, at block 502, the method may include receiving, from a pipeline (e.g., the print pipeline 106 or a different pipeline) associated with printing of an input document 108, an input object type associated with the input document 108 that is to be printed.

At block 504, the method may include analyzing the input object type to determine whether the input object type is a correct object type (e.g., is a raster object type indeed a raster object, as disclosed herein).

At block 506, in response to a determination that the input object type is not the correct object type (e.g., the raster object type is a text object), the method may include changing the input object type to the correct object type, and configuring the pipeline based on the correct object type to generate a printed document 110.

At block 508, in response to a determination that the input object type is the correct object type, the method may include configuring the pipeline based on the input object type to generate the printed document 110.

At block 510, the method may include implementing a toner savings (e.g., by using the toner application module 112) based on the configuration of the pipeline.

Referring to FIG. 6, for the method 600, at block 602, the method may include analyzing, downstream of a pipeline (e.g., the print pipeline 106 or a different pipeline) associated with printing of an input document 108, an input object type associated with the input document 108 that is to be printed.

At block 604, the method may include selectively changing the input object type based on the analysis to a correct object type in response to a determination that the input object type is not the correct object type.

At block 606, the method may include configuring the pipeline based on the correct object type to generate a printed document 110.

At block 608, the method may include implementing a toner savings based on the configuration of the pipeline.

Referring to FIG. 7, for the method 700, at block 702, the method may include analyzing, from a pipeline (e.g., the print pipeline 106 or a different pipeline) associated with printing of an input image, an input object type associated with the input image.

At block 704, the method may include determining whether the input object type is a specified object type (e.g., is the input object type a specified object type such as a raster object).

At block 706, in response to a determination that the input object type is not the specified object type, the method may include changing the input object type to the specified object type or to a different object type (e.g., changing the input object type to the raster object type or to a vector object), and configuring the pipeline based on the specified object type or the different object type.

At block 708, in response to a determination that the input object type is the specified object type, the method may include configuring the pipeline based on the input object type.

At block 710, the method may include determining, based on the configuration of the pipeline, a classification of the input object type.

At block 712, the method may include implementing a toner savings based on the classification of the input object type.

Figure 8:
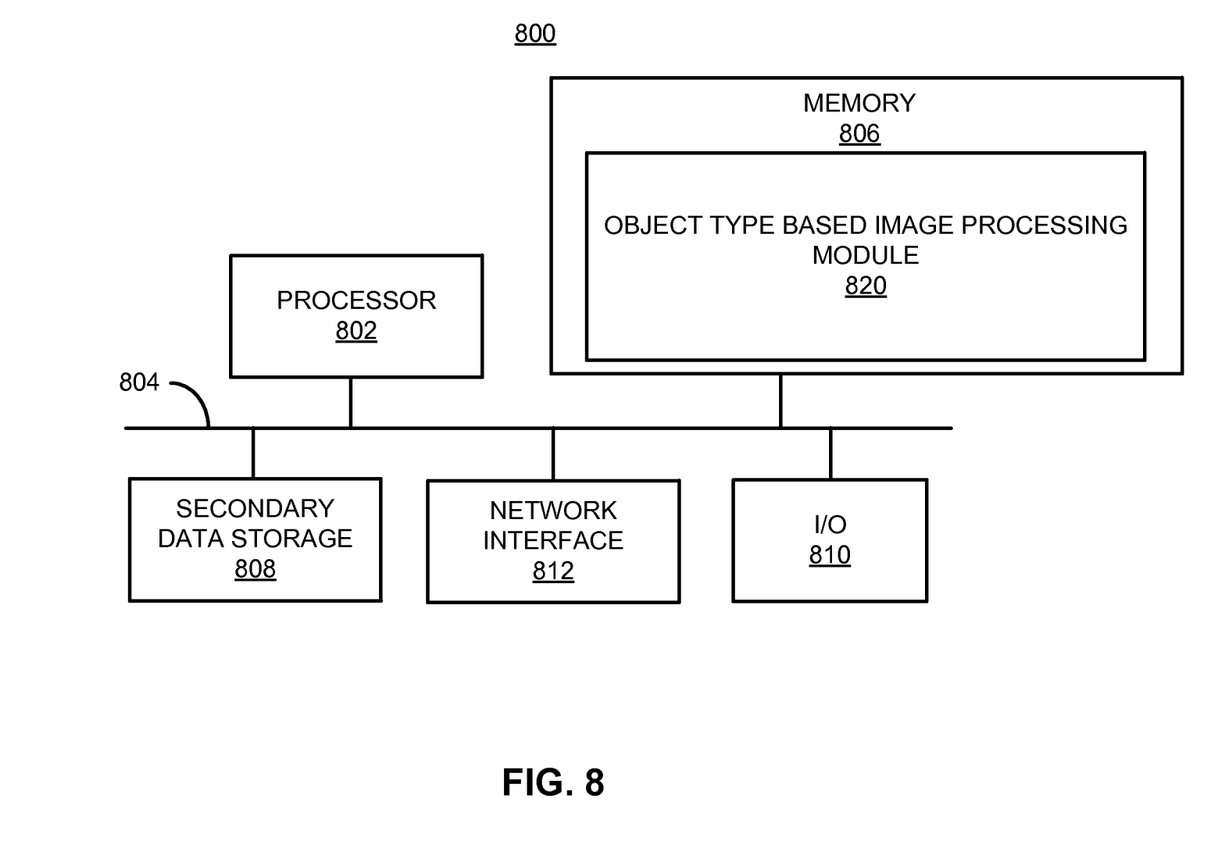
FIG. 8 illustrates a computer system, according to an example of the present disclosure.

FIG. 8 shows a computer system 800 that may be used with the examples described herein. The computer system 800 may represent a generic platform that includes components that may be in a server or another computer system. The computer system 800 may be used as a platform for the apparatus 102. The computer system 800 may execute, by a processor (e.g., a single or multiple processors) or other hardware processing circuit, the methods, functions and other processes described herein. These methods, functions and other processes may be embodied as machine readable instructions stored on a computer readable medium, which may be non-transitory, such as hardware storage devices (e.g., RAM (random access memory), ROM (read only memory), EPROM (erasable, programmable ROM), EEPROM (electrically erasable, programmable ROM), hard drives, and flash memory).

The computer system 800 may include a processor 802 that may implement or execute machine readable instructions performing some or all of the methods, functions and other processes described herein. Commands and data from the processor 802 may be communicated over a communication bus 804. The computer system may also include a main memory 806, such as a random access memory (RAM), where the machine readable instructions and data for the processor 802 may reside during runtime, and a secondary data storage 808, which may be non-volatile and stores machine readable instructions and data. The memory and data storage are examples of computer readable mediums. The memory 806 may include an object type based image processing module 820 including machine readable instructions residing in the memory 806 during runtime and executed by the processor 802. The object type based image processing module 820 may include the modules of the apparatus 102 shown in FIGS. 1 and 2.

The computer system 800 may include an I/O device 810, such as a keyboard, a mouse, a display, etc. The computer system may include a network interface 812 for connecting to a network. Other known electronic components may be added or substituted in the computer system.

What has been described and illustrated herein is an example along with some of its variations. The terms, descriptions and figures used herein are set forth by way of illustration only and are not meant as limitations. Many variations are possible within the spirit and scope of the subject matter, which is intended to be defined by the following claims—and their equivalents—in which all terms are meant in their broadest reasonable sense unless otherwise indicated.

What is claimed is:

1. A method for object type based image processing, the method comprising:
receiving, from a pipeline associated with printing of an input document, an input object type associated with the input document that is to be printed;
analyzing, by a processor, the input object type to determine whether the input object type is a correct object type;
in response to a determination that the input object type is not the correct object type,
changing the input object type to the correct object type, and
configuring the pipeline based on the correct object type to generate a printed document;
in response to a determination that the input object type is the correct object type, configuring the pipeline based on the input object type to generate the printed document; and
implementing a toner savings based on the configuration of the pipeline.

2. The method of claim 1, wherein the input object type includes a text object type, a vector object type, or raster object type.

3. The method of claim 1, wherein the input object type includes a specified shape.

4. The method of claim 1, wherein implementing the toner savings based on the configuration of the pipeline further comprises:
implementing the toner savings as a percentage of toner usage reduction based on the configuration of the pipeline.

5. The method of claim 4, wherein implementing the toner savings as the percentage of toner usage reduction based on the configuration of the pipeline further comprises:
reducing the percentage of toner usage reduction as a toner cartridge for application of the toner approaches an end of a specified life of the toner cartridge.

6. The method of claim 4, wherein implementing the toner savings as the percentage of toner usage reduction based on the configuration of the pipeline further comprises:
changing the percentage of toner usage reduction as a toner cartridge for application of the toner approaches an end of a specified life of the toner cartridge.

7. The method of claim 1, wherein implementing the toner savings based on the configuration of the pipeline further comprises:
for the configuration of the pipeline based on the correct object type, implementing the toner savings as a specific level of toner usage based on the correct object type; and
for the configuration of the pipeline based on the input object type, implementing the toner savings as the specific level of toner usage based on the input object type.

8. The method of claim 1, wherein implementing the toner savings based on the configuration of the pipeline further comprises:
implementing the toner savings as a modification of laser power application based on the configuration of the pipeline.

9. The method of claim 1, wherein the input document is a copied or scanned document that is used to generate the input object type.

10. An object type based image processing apparatus comprising:

a processor; and
a memory storing machine readable instructions that when executed by the processor cause the processor to:
analyze, downstream of a pipeline associated with printing of an input document, an input object type associated with the input document that is to be printed;
selectively change the input object type based on the analysis to a correct object type in response to a determination that the input object type is not the correct object type;
configure the pipeline based on the correct object type to generate a printed document; and
implement a toner savings based on the configuration of the pipeline.

11. The object type based image processing apparatus according to claim 10, wherein the input object type is determined based on a specified color in a rendered image related to the input document.

12. The object type based image processing apparatus according to claim 10, wherein the machine readable instructions to implement the toner savings based on the configuration of the pipeline, further comprise machine readable instructions that when executed by the processor further cause the processor to:
implement the toner savings as a user specified preference related to the input object type based on the configuration of the pipeline.

13. A non-transitory computer readable medium having stored thereon machine readable instructions to provide object type based image processing, the machine readable instructions, when executed, cause a processor to:
analyze, from a pipeline associated with printing of an input image, an input object type associated with the input image;
determine whether the input object type is a specified object type;
in response to a determination that the input object type is not the specified object type,
change the input object type to the specified object type or to a different object type, and
configure the pipeline based on the specified object type or the different object type;
in response to a determination that the input object type is the specified object type, configure the pipeline based on the input object type;
determine, based on the configuration of the pipeline, a classification of the input object type; and
implement a toner savings based on the classification of the input object type.

14. The non-transitory computer readable medium according to claim 13, wherein the classification of the input object type includes a text object type, a vector object type, a raster object type, or a user defined object type.

15. The non-transitory computer readable medium according to claim 13, further comprising machine readable instructions that when executed by the processor further cause the processor to:
implement the toner savings based on a user type or a position of a user.

* * * * *